US011866235B2

(12) United States Patent
Theis et al.

(10) Patent No.: US 11,866,235 B2
(45) Date of Patent: Jan. 9, 2024

(54) BLANK, THREE-DIMENSIONAL STRUCTURE PRODUCED THEREFROM, AND FOLDING BOX

(71) Applicant: MAYR-MELNHOF KARTON AG, Wien (DE)

(72) Inventors: Uwe Theis, Riveris (DE); Harman Vorenkamp, Auenwald (DE)

(73) Assignee: MAYR-MELNHOF KARTON AG, Vienna (AT)

( * ) Notice: Subject to any disclaimer, the term of this patent is extended or adjusted under 35 U.S.C. 154(b) by 276 days.

(21) Appl. No.: 16/639,359

(22) PCT Filed: Aug. 2, 2018

(86) PCT No.: PCT/EP2018/070981
§ 371 (c)(1),
(2) Date: Feb. 14, 2020

(87) PCT Pub. No.: WO2019/034438
PCT Pub. Date: Feb. 21, 2019

(65) Prior Publication Data

US 2020/0247576 A1 Aug. 6, 2020

(30) Foreign Application Priority Data

Aug. 18, 2017 (DE) .................... 20 2017 104 977.9

(51) Int. Cl.
*B65D 5/42* (2006.01)
*B65D 5/20* (2006.01)
(Continued)

(52) U.S. Cl.
CPC .......... *B65D 5/4266* (2013.01); *B31B 50/742* (2017.08); *B65D 5/20* (2013.01);
(Continued)

(58) Field of Classification Search
CPC ........ B65D 5/4266; B65D 5/20; B65D 5/425; B65D 85/10; B65D 33/02; B31B 50/742; B31B 50/25; B31B 50/20
(Continued)

(56) References Cited

U.S. PATENT DOCUMENTS 3,843,113 A * 10/1974 Schaffer ................ B65H 45/30 281/38
6,276,600 B1 8/2001 Rigby
(Continued)

FOREIGN PATENT DOCUMENTS

CN 102180318 A 9/2011
DE 43 11 568 A 10/1994
(Continued)

OTHER PUBLICATIONS

International Search Report dated Oct. 22, 2018 in corresponding International Application No. PCT/EP2018/070981.
(Continued)

*Primary Examiner* — Christopher R Demeree
(74) *Attorney, Agent, or Firm* — MEDLER FERRO WOODHOUSE & MILLS PLLC

(57) ABSTRACT

A blank for producing a three-dimensional structure, from paper, cardboard, or plastic, includes at least three lateral surfaces and at least one bottom and/or top tab for forming the three-dimensional structure in a folded state of the blank. At least two of the lateral surfaces and/or at least one of the lateral surfaces having the bottom and/or cover tab being connected to one another by means of at least one mechanically produced creasing line. The creasing line is produced without ablation or other removal of material from the blank, at least one groove being produced by means of a laser within at least one of the lateral surfaces connected by means of the creasing line. The groove being configured to run at
(Continued)

an angle to the creasing line and impinging on or intersecting the creasing line. A three-dimensional structure and a folding box produced from the blank are also disclosed.

19 Claims, 2 Drawing Sheets

(51) Int. Cl.

| | |
|---|---|
| ***B65D 85/10*** | (2006.01) |
| ***B31B 50/74*** | (2017.01) |
| *B31B 50/62* | (2017.01) |
| *B31B 110/35* | (2017.01) |
| *B31B 120/10* | (2017.01) |
| *B31B 50/26* | (2017.01) |

(52) U.S. Cl.

CPC ............. *B65D 5/425* (2013.01); *B65D 85/10* (2013.01); *B31B 50/26* (2017.08); *B31B 50/624* (2017.08); *B31B 2110/35* (2017.08); *B31B 2120/102* (2017.08); *B31B 2241/003* (2013.01)

(58) Field of Classification Search

USPC ........ 229/116.1, 920, 160.1, 198.2; 206/268, 206/273, 259; 493/357, 421, 59

See application file for complete search history.

(56) References Cited

U.S. PATENT DOCUMENTS

| | | | | |
|---|---|---|---|---|
| 6,457,580 | B1 * | 10/2002 | Focke | B65D 85/1056 206/268 |
| 2005/0014621 | A1 * | 1/2005 | McClure | B65D 5/4266 493/59 |
| 2006/0207212 | A1 * | 9/2006 | Durney | E04C 3/32 52/846 |
| 2013/0206617 | A1 | 8/2013 | Lutzig et al. | |
| 2014/0374291 | A1 | 12/2014 | Young | |
| 2018/0178944 | A1 | 6/2018 | Theis et al. | |
| 2021/0114765 | A1 * | 4/2021 | Kollmann | B31B 50/002 |

FOREIGN PATENT DOCUMENTS

| | | | |
|---|---|---|---|
| DE | 200 10 593 | U1 | 8/2000 |
| DE | 101 06 547 | A1 | 8/2002 |
| DE | 20 2004 011 165 | U1 | 12/2005 |
| DE | 600 28 078 | T2 | 1/2007 |
| EP | 2 141 090 | A1 | 1/2010 |
| EP | 2 700 583 | A1 | 2/2014 |
| EP | 2860024 | A1 | 4/2015 |
| EP | 3 040 292 | A1 | 7/2016 |
| RU | 2530376 | C1 | 10/2014 |
| WO | 2012/123189 | A1 | 9/2012 |
| WO | 2013/117283 | A1 | 8/2013 |
| WO | 2016/107903 | A1 | 7/2016 |
| WO | 2016/107929 | A1 | 7/2016 |
| WO | 2016/198317 | A1 | 12/2016 |
| WO | 2017/001608 | A1 | 1/2017 |
| WO | 2017/001615 | A1 | 1/2017 |

OTHER PUBLICATIONS

German Search Report dated Feb. 20, 2018 in corresponding German Application No. 20 2017 104 977.9.

Russian Search Report issued in corresponding Russian Patent Application No. 2020111017/11(018459) dated Sep. 29, 2021.

Office Action dated Apr. 21, 2022 in corresponding Japanese Patent Appl. No. 2020-506340 (with English language translation.).

* cited by examiner

BLANK, THREE-DIMENSIONAL STRUCTURE PRODUCED THEREFROM, AND FOLDING BOX

FIELD

The present invention relates to a blank for producing a three-dimensional structure of paper, cardboard or plastic, in particular a package or the like, including at least three lateral surfaces as well as at least one bottom and/or cover tab for forming the three-dimensional structure in a folded state of the blank, wherein at least two of the lateral surfaces and/or at least one of the lateral surfaces having the bottom and/or cover tab are connected to each other by means of at least one mechanically produced creasing line. Furthermore, the invention relates to a three-dimensional structure of paper, cardboard or plastic and a folding box for storing goods, in particular folding box of cardboard, paper or the like.

BACKGROUND

Such blanks, three-dimensional structures and folding boxes are known in a great plurality. Among other things, these blanks or three-dimensional structures and folding boxes, respectively, are flip packs, which represent a widespread form of package for cigarettes and the like. Thus, DE 43 11 568 A1, EP 2 141 090 A1, DE 101 06 547 A1, U.S. Pat. No. 6,276,600 B1 and DE 600 28 078 T2 describe packages in the form of a prismatic body along their longitudinal axis, wherein a cover is hinged to a container-like receiving area. Furthermore, the generic blanks and packages are used for filling, the transport and the storage of packaged or unpackaged pourable goods. Therein, the goods can for example be cereals, cornflakes or other pourable and free-flowing food. From DE 20 2004 011 165 U1, a powder-proof package for powdery goods is known. Therein, the known package is formed in the form of a prismatic, octagonal body along a longitudinal axis. Production by means of laser energy is relatively time-consuming and energy-intensive due to the plurality of required cutting lines. From WO 2016/198317 A1, a blank for producing a three-dimensional structure of paper, cardboard or plastic, in particular a package or the like, is additionally known, in which at least one folding surface for forming a rounded edge area of the three-dimensional structure is present in a folded state of the blank. Therein, the folding surface is bounded by two lateral folding lines extending parallel to each other, wherein at least one creasing line extending at an angle to the lateral folding lines is formed within the folding surface. Therein, the lateral folding lines and the creasing line are produced by means of laser energy and/or punching. However, it is disadvantageous in the known blanks that the mechanically produced creasing lines and folding lines, respectively, only displace the material of the blank from the center of the lines to the respective lateral edge of the lines. Therefore, such mechanically produced lines tend to the fact that the displaced material again folds back. However, in particular technical as well as aesthetic disadvantages of the structures and folding boxes, respectively, folded from the blanks arise thereby. In particular, such folding boxes are not always dimensionally stable such that problems can occur in particular in the transport and/or in the storage and/or in stacking these folding boxes. Production of all of the creasing and folding lines by means of laser energy is very energy-intensive and therefore expensive.

Therefore, it is the object of the present invention to provide a generic blank for producing a three-dimensional structure of paper, cardboard or plastic, a corresponding three-dimensional structure as well as a corresponding folding box of paper, cardboard or plastic, which can be inexpensively produced and minimizes or prevents the tendency of mechanically produced creasing lines to fold back.

SUMMARY

A blank comprising the features of claim 1, a three-dimensional structure comprising the features of claim 9 as well as a folding box comprising the features of claim 11 serve for solving these objects. Advantageous configurations with convenient developments of the invention are specified in the respective dependent claims, wherein advantageous configurations of the blank are to be regarded as advantageous configurations of the three-dimensional structure according to the invention and the folding box according to the invention, respectively, and vice versa.

A first aspect of the present invention relates to a blank for producing a three-dimensional structure of paper, cardboard or plastic, in particular a package or the like, including at least three lateral surfaces as well as at least one bottom and/or cover tab for forming the three-dimensional structure in a folded state of the blank, wherein at least two of the lateral surfaces and/or at least one of the lateral surfaces having the bottom and/or cover tab are connected to each other by means of at least one mechanically produced creasing line. Therein, the mechanically produced creasing line is produced without ablation or other removal of material of the blank, in addition, at least one groove produced by means of a laser is formed within at least one of the lateral surfaces connected by means of the creasing line, wherein the groove is formed extending at an angle to the creasing line and impinges on or intersects it. By the configuration of the blank according to the invention, it is ensured that residual stresses arising by the mechanical production of the creasing line, that is production without material ablation, can be discharged into the groove produced by means of laser. By the relief of the residual stress or residual stresses in the creasing line, it is prevented that the displaced material of the creasing line again folds back. Thereby, the tendency of mechanically produced creasing lines to fold back is minimized or prevented. In particular, the invention takes advantage of the fact that material is burnt and evaporated, respectively, in the production of grooves by means of laser. Displacement of material for producing a line is not effected. In addition, by the combination of the grooves produced by means of laser with mechanically produced creasing lines, a majority of energy can be saved in the production of the blank. Thereby, the production of the blank becomes more inexpensive.

In advantageous configurations of the blank according to the invention, the at least one lateral surface connected by means of the creasing line comprises at least two grooves produced by means of a laser, wherein a distance between points of impingement or intersection of the respective groove with the corresponding creasing line is at least 50%, in particular between 75% and 98% of a length of the creasing line. Thereby, it is ensured that residual stresses in the mechanically produced creasing line can be relieved over the entire extension thereof.

In further advantageous configurations of the blank according to the invention, the at least two grooves intersect each other or impinge on each other within the lateral surface. Furthermore, there is the possibility that the grooves are arranged such that they form a decorative pattern within the lateral surface. Furthermore, there is the possibility that the grooves are arranged such that they form different or identical partial surfaces within the lateral surface. Finally, the grooves can be formed straight, bent, wave-like, meandering, step-like or a combination of these geometries. Besides an optimum adaptation of the grooves to the present mechanical creasing lines and thereby a relief of the residual stress in the creasing line as great as possible, corresponding production and/or design specifications can be satisfied by the grooves produced by means of laser within the lateral surface. In the folded state of the blank, corresponding patterns arise on the outer surface of the lateral surface, which arise by the grooves formed on the inner side of the three-dimensional structure. Thereby, haptic differences of three-dimensional structures and folding boxes, respectively, can for example be represented.

In a further advantageous configuration of the blank according to the invention, a depth of the groove is between 10% and 80% of a thickness of the corresponding lateral surface. Therein, the depth of the groove can be adapted to the used material and the requirements thereof. The height and clarity, respectively, of the highlighting of the corresponding pattern of the visible line or visible pattern on the opposing surface of the lateral surface can also be adjusted by means of the depth of the groove.

In further advantageous configurations of the blank according to the invention, the creasing line is formed straight, bent, wave-like, meandering, step-like or of corresponding combinations thereof. In addition, the creasing line can be formed as a continuous or interrupted creasing line between the lateral folding lines. Advantageously, a plurality of design requirements can thereby in turn be satisfied.

A second aspect of the present invention relates to a three-dimensional structure of paper, cardboard or plastic, which is produced by folding and/or adhering a blank as it has been described above. The possibilities of configuration and advantages of a three-dimensional structure thus produced result from the possibilities of configuration and advantages also described above of the described blank according to the invention according to the first inventive aspect. Therein, the three-dimensional structure can be used as a package, in particular as a package for storing cigarettes or other goods, such as for example for the transport and the storage of packaged or unpackaged pourable or non-pourable goods.

A third aspect of the present invention relates to a folding box for storing goods, in particular a folding box of cardboard, paper or the like, wherein the folding box comprises at least three lateral walls as well as at least one bottom and/or cover tab for forming a receiving space and at least two of the lateral walls and/or at least one of the lateral walls having the bottom and/or cover tab are connected to each other by means of at least one mechanically produced creasing line. Therein, the mechanically produced creasing line is produced without ablation or other removal of material of the blank. Therein, at least one groove produced by means of a laser is formed within at least one of the lateral walls connected by means of the creasing line, wherein the groove is formed extending at an angle to the creasing line and impinges on or intersects it. By the formation of at least one groove produced by means of a laser, which additionally intersects or impinges on the mechanically produced creasing line, it is ensured that residual stresses within the creasing line, which is produced without material ablation, can be discharged into the laser groove. Since material is not displaced in producing the grooves by means of laser, but the material is burnt and evaporated, respectively, residual stresses, which arise by the mechanical displacement of the material in producing the creasing line, can here be readily discharged. However, the tendency of folding back of the lateral walls connected by means of the creasing line is thereby also minimized or completely prevented. The folding boxes thus configured are dimensionally stable. Furthermore, the use of mechanically produced creasing lines and grooves produced by means of laser results in a considerably reduced energy consumption in the production of the folding box and the blank underlying the folding box, respectively. Thus, the production of the folding boxes according to the invention cheapens.

In further advantageous configurations of the folding box according to the invention, the at least one lateral wall connected by means of the creasing line comprises at least two grooves produced by means of a laser, wherein a distance between points of impingement or intersection of the respective groove with the corresponding creasing line is at least 50%, in particular between 75% and 98% of a length of the creasing line. Thereby, it is ensured according to the invention that residual stresses present in the creasing line can be discharged via the grooves over the entire length thereof.

In further advantageous configurations of the folding box according to the invention, the at least two grooves intersect each other or impinge on each other within the lateral wall. Furthermore, there is the possibility that the grooves are arranged such that they form a decorative pattern within the lateral wall. In addition, there is the possibility that the grooves are arranged such that they form different or identical partial surfaces within the lateral wall. Finally, there is also the possibility that the groove is formed straight, bent, wave-like, meandering, step-like or of a combination of these geometries. Thereby, there is advantageously the possibility of satisfying corresponding production and/or design specifications within the lateral surface. In particular, there is the possibility of for example configuring different haptic patterns on the outer side of the lateral wall. The grooves and patterns of the grooves, respectively, visible and/or tangible on the outer side of the lateral wall arise by the grooves produced by means of laser on the inner side of the corresponding lateral wall. These patterns come into their own by slightly bending the corresponding areas of the lateral wall comprising the patterns.

In a further advantageous configuration of the folding box according to the invention, a depth of the groove is between 10% and 80% of a thickness of the corresponding lateral wall. The degree of the visibility of the groove and the patterns produced by the grooves, respectively, on the outer side of the corresponding lateral wall can also be regulated via the depth of the groove.

In further advantageous configurations of the folding box according to the invention, it can be a package for storing cigarettes or a package for storing other goods, in particular for the transport and the storage of packaged or unpackaged pourable or non-pourable goods.

Further features and the advantages thereof are apparent from the description of the first and the second inventive aspect, wherein advantageous configurations of the first and the second inventive aspect are to be regarded as advantageous configurations of the third inventive aspect and vice versa.

Further advantages, features and details of the invention are apparent from the following description of two embodiments as well as based on the drawings. The features and feature combinations mentioned above in the description as well as the features and feature combinations mentioned below in the description of figures and/or shown in the figures alone are usable not only in the respectively specified combination, but also in other combinations or alone without departing from the scope of the invention.

DETAILED DESCRIPTION

Figure 1:
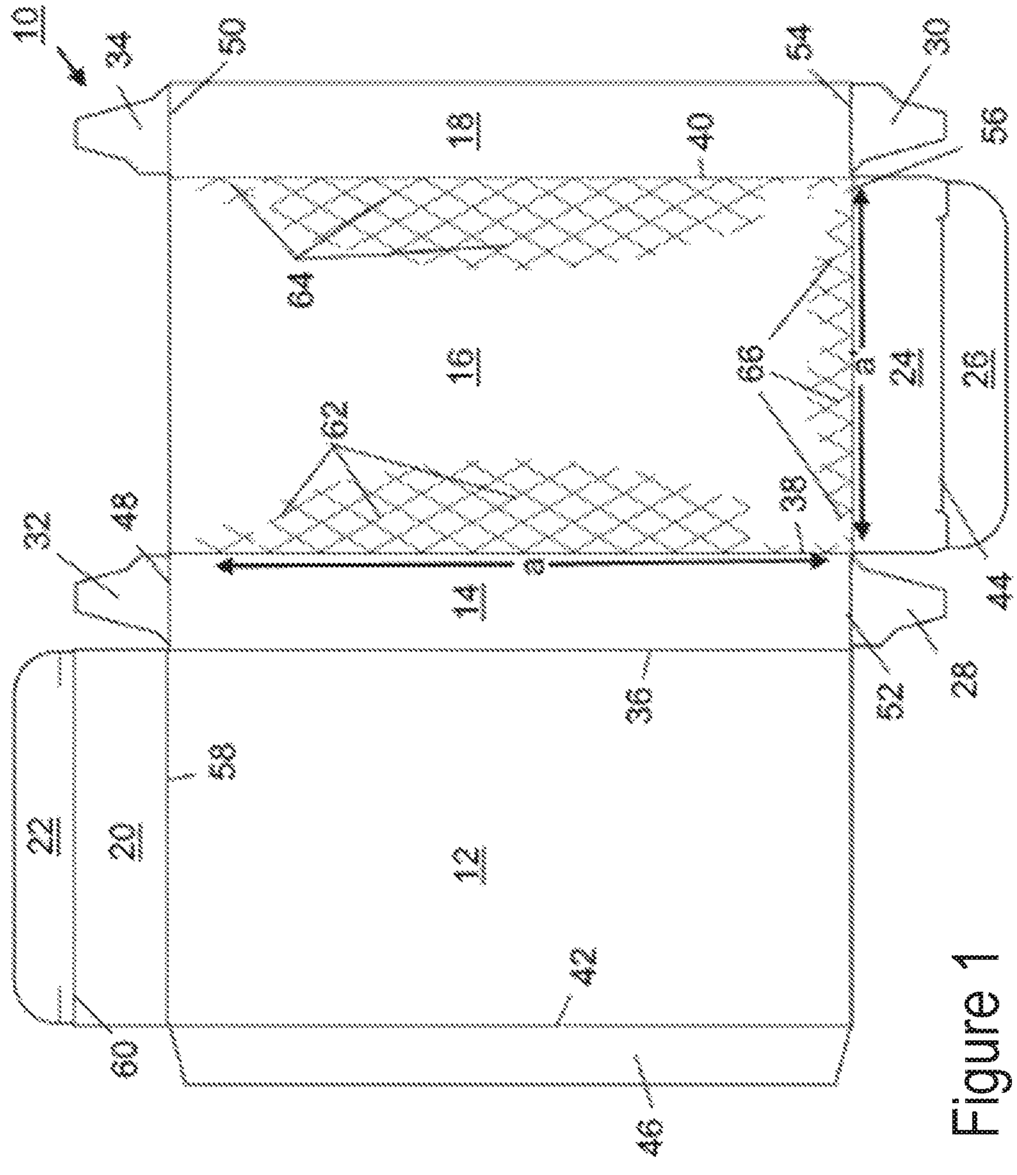
FIG. 1 is a schematic representation of a blank according to the invention according to a first embodiment.

FIG. 1 shows a schematic representation of a blank 10 for producing a three-dimensional structure of cardboard according to a first embodiment. Therein, the three-dimensional structure is a package, in particular a folding box. Therein, the blank 10 includes four lateral surfaces 12, 14, 16, 18, which are connected to each other by means of creasing lines 36, 38, 40. Therein, the lateral surface 12 is connected to an adhesive tab 46 by means of a creasing line 42 opposing the creasing line 36 and extending parallel hereto. In the folded state of the blank 10, the adhesive tab 46 is adhered to the lateral surface 18. Furthermore, one recognizes that the lateral surface 12 is connected to the cover tab 20 by means of a bending line 58. In contrast, the lateral surface 16 is connected to a bottom tab 24 opposing the cover tab 20 by means of a bending line 56. On the side of the cover tab 20 opposing the creasing line 58, a bending line 60 extending parallel thereto is formed, by means of which the cover tab 20 is connected to an insertion tab 22. The bottom tab 24 is connected to the insertion tab 26 by means of a creasing line 44.

Furthermore, one recognizes that closure tabs 28, 30, 32, 34 are hinged to the opposing, short ends of the lateral walls 14, 18 respectively by means of bending lines 48, 50, 52, 54.

In the illustrated embodiment, the creasing lines 36, 38, 40 connecting the lateral walls 12, 14, 16, 18 as well as the creasing lines 56, 58, by means of which the bottom tab 24 and the cover tab 20 are hinged to the lateral walls 12, 16, are in particular formed as mechanically produced creasing lines.

Furthermore, it becomes clear from FIG. 1, that a plurality of grooves 62, 64, 66 is formed within the lateral surface 16, wherein the grooves 62, 64, 66 are each formed extending at an angle to the corresponding creasing line 38, 40, 56 and each impinge on it. Therein, the grooves 62, 64, 66 are produced by means of a laser. Therefore, the grooves 62, 64, 66 arise by evaporation of the material of the blank 10. In contrast thereto, in the mechanical production of the creasing lines 38, 40, 56, that is production without material ablation, the material of the blank 10 is only displaced. Thereby, there is the tendency in these areas that the displaced material again folds back. However, these residual stresses can be absorbed by the corresponding grooves 62, 64, 66 connected to the creasing lines 38, 40, 56. Thereby, the entire tendency of folding back can be minimized or completely prevented. Furthermore, one recognizes that the grooves 62, 64, 66 each form patterns, in particular rhombus-like patterns. The thus patterned areas of the lateral surface 16 are visible on the outer surface of the lateral wall 16 in the folded state of the blank 10 and therefore form a characteristic design, which results in a distinct recognition value of the three-dimensional structure produced from the blank 10. In addition, the haptic changes on the mentioned outer side of the lateral surface 16, wherein this haptic also represents a characteristic recognition value.

Furthermore, the plurality of grooves 62, 64, 66 is formed such that a distance a, a' between the respectively outermost points of impingement of the grooves 62, 64, 66 on the respective creasing line 38, 40, 56 is above 50% of a length of the corresponding creasing line 38, 40, 56. In the illustrated embodiment, the distance a, a' is ca. 90% of the length of the respective creasing line 38, 40, 56. Thereby, possibly present residual stresses in the creasing lines 38, 40, 56 can be reliably absorbed in the grooves 62, 64, 66 over the entire length of the corresponding creasing line 38, 40, 56 and discharged into them.

In the illustrated embodiment, the grooves 62, 64, 66 are formed straight and intersect each other within the lateral surface 16. Other patterns and groove extensions are also conceivable.

The illustrated blank 10 serves for producing a three-dimensional structure, in particular a folding box for packaging, the transport and the storage of packaged and/or unpackaged pourable or non-pourable goods.

Figure 2:
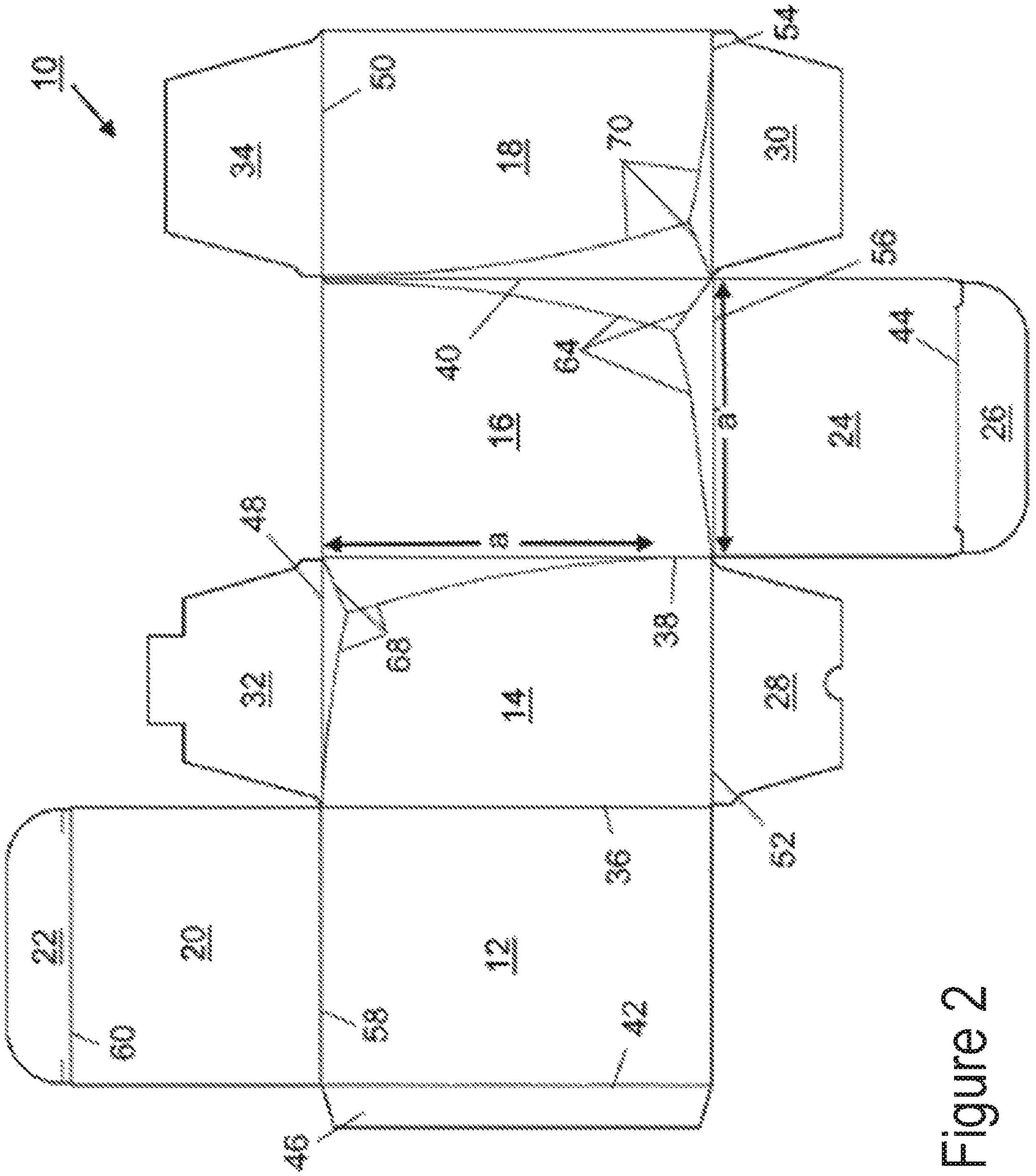
FIG. 2 is a schematic representation of a blank according to the invention according to a second embodiment.

FIG. 2 shows a schematic representation of a blank 10 for producing a three-dimensional structure of cardboard according to a second embodiment. One recognizes that the lateral walls 12, 14, 16, 18 have other dimensions compared to the embodiment shown in FIG. 1. Here, in addition, grooves 64 are not only formed in the lateral wall 16, but grooves 68, 70 are also formed in the lateral walls 14, 18. Therein, the grooves 68 within the lateral wall 14, the grooves 64 within the lateral wall 16 and the grooves 70 within the lateral wall 18 each impinge on each other at a predetermined point and form a corresponding design. Therein, the grooves 64, 68, 70 are formed within the lateral walls 14, 16, 18 such that each two grooves 64, 68, 70 contact or intersect the creasing line 38 connecting the lateral walls 14, 16 and the creasing line 40 connecting the lateral walls 16, 18, respectively, at corresponding points of impingement. Furthermore, two of the grooves 64, 68, 70 impinge on the creasing line 48 connecting the lateral wall 14 to the closure tab 32, the creasing line 56 connecting the lateral wall 16 to the bottom tab 24 as well as the creasing line 54 connecting the lateral wall 18 to the closure tab 30. In order to ensure this, each one of the grooves 64, 68, 70 impinges on the respective point of intersection between the creasing line 48 and the creasing line 32, and between the creasing line 40 and the creasing line 56, and the creasing line 40 with the creasing line 54, respectively. It becomes clear from FIG. 2 too, that the distance a, a' between the respectively outer points of impingement of the respective groove 64, 68, 70 on the corresponding creasing lines 38, 40, 48, 54, 56 is above 50% of the length of the corresponding creasing line. With respect to the further configuration of the blank 10 according to the second embodiment, we make reference to the description of the blank 10 according to the first embodiment, wherein identical reference characters denote identical or comparable features.

What is claimed is:

1. A blank for producing a three-dimensional structure of paper, cardboard or plastic, in particular a package or the like, comprising:

at least three lateral surfaces, and at least one bottom and/or cover tab for forming the three-dimensional structure in a folded state of the blank, wherein at least two of the lateral surfaces and/or at least one of the lateral surfaces having the at least one bottom and/or cover tab are connected to each other by at least one mechanically produced creasing line, the mechanically produced creasing line being produced without ablation or other removal of material of the blank such that the material of the creasing line is only displaced, and at least one groove formed to extend at an angle to the creasing line to impinge on or intersect with the creasing line and thereby absorb residual stresses of the mechanically produced creasing line, wherein the at least one groove is produced by a laser such that material of the blank is removed from the at least one groove, and the at least one groove is formed within at least one lateral surface of the lateral surfaces connected by the creasing line.

2. The blank according to claim 1, wherein the at least one lateral surface connected by the creasing line comprises at least two grooves produced by a laser, wherein a distance between points of impingement or intersection of the at least two grooves with the creasing line is at least 50% of a length of the creasing line.

3. The blank according to claim 2, wherein the distance is between 75% and 98% of the length of the creasing line.

4. The blank according to claim 2, wherein the at least two grooves intersect each other or impinge on each other within the at least one lateral surface.

5. The blank according to claim 2, wherein the at least two grooves are arranged such that they form a decorative pattern within the lateral surface.

6. The blank according to claim 2, wherein the at least two grooves are arranged such that they form different or identical partial surfaces within the at least one lateral surface.

7. The blank according to claim 2, wherein a depth of the at least two grooves is between 10% and 80% of a thickness of the at least one lateral surface.

8. The blank according to claim 2, wherein the at least two grooves are formed straight, bent, wave-like, meandering, step-like or combinations thereof.

9. A three-dimensional structure of paper, cardboard or plastic, which is produced by folding and/or adhering a blank according to claim 1.

10. The three-dimensional structure according to claim 9, wherein the three-dimensional structure is a package, in particular a package for storing cigarettes or other goods, in particular for the transport and the storage of packaged or unpackaged pourable or non-pourable goods.

11. A folding box for storing goods, in particular a folding box of cardboard, paper or the like, comprising:

at least three lateral walls, and at least one bottom and/or cover tab for forming a receiving space, wherein at least two of the lateral walls and/or at least one of the lateral walls having the at least one bottom and/or cover tab are connected to each other by at least one mechanically produced creasing line, the mechanically produced creasing line being produced without ablation or other removal of material of a blank such that the material of the creasing line is only displaced, and at least one groove formed to extend at an angle to the creasing line to impinge on or intersect with the creasing line and thereby absorb residual stresses of the mechanically produced creasing line, wherein the at least one groove is produced by means of a laser such that material of the blank is removed from the at least one groove, and the at least one groove is formed within at least one lateral wall of the lateral walls connected by the creasing line.

12. The folding box according to claim 11, wherein the at least one lateral wall of the lateral walls connected by the creasing line comprises at least two grooves produced by a laser, wherein a distance between points of impingement or intersection of a respective groove of the at least two grooves with the creasing line is at least 50% of a length of the creasing line.

13. The folding box according to claim 12, wherein the at least two grooves intersect each other or impinge on each other within the at least one lateral wall.

14. The folding box according to claim 12, wherein the at least two grooves are arranged such that they form a decorative pattern within the at least one lateral wall.

15. The folding box according to claim 12, wherein the at least two grooves are arranged such that they form different or identical partial surfaces within the at least one lateral wall.

16. The folding box according to claim 12, wherein the distance is between 75% and 98% of the length of the creasing line.

17. The folding box according to claim 11, wherein a depth of the at least one groove is between 10% and 80% of a thickness of the at least one lateral wall.

18. The folding box according to claim 11, wherein the at least one groove is formed straight, bent, wave-like, meandering, step-like or combinations thereof.

19. The folding box according to claim 11, wherein the folding box is a package, in particular a package for storing cigarettes or other goods, in particular for the transport and the storage of packaged or unpackaged pourable or non-pourable goods.

* * * * *